United States Patent
Algüera

(10) Patent No.: US 7,967,319 B2
(45) Date of Patent: Jun. 28, 2011

(54) VEHICLE COUPLING AID WITH AUTOMATICALLY MOVING SUPPLY LINE CONNECTOR BRACKET

(75) Inventor: José Algüera, Aschaffenburg (DE)

(73) Assignee: Jost-Werke GmbH, Neu-Isenburg (DE)

( * ) Notice: Subject to any disclaimer, the term of this patent is extended or adjusted under 35 U.S.C. 154(b) by 327 days.

(21) Appl. No.: 12/225,143

(22) PCT Filed: Mar. 14, 2007

(86) PCT No.: PCT/EP2007/002226
§ 371 (c)(1),
(2), (4) Date: Feb. 9, 2009

(87) PCT Pub. No.: WO2007/104544
PCT Pub. Date: Sep. 20, 2007

(65) Prior Publication Data
US 2009/0184490 A1 Jul. 23, 2009

(30) Foreign Application Priority Data
Mar. 15, 2006 (DE) .......................... 10 2006 012 800

(51) Int. Cl.
*B60D 1/62* (2006.01)
*B62D 53/08* (2006.01)
*B62D 53/00* (2006.01)

(52) U.S. Cl. ..................... 280/420; 280/425.1; 280/428; 280/429

(58) Field of Classification Search .................. 280/420, 280/421, 422
See application file for complete search history.

(56) References Cited

U.S. PATENT DOCUMENTS

| | | | |
|---|---|---|---|
| 3,888,513 A | 6/1975 | Pilz et al. | |
| 5,346,239 A | 9/1994 | Wohlhuter | |
| 5,458,357 A | 10/1995 | Wohlhuter | |
| 2002/0050698 A1 | 5/2002 | Dippenaar | |
| 2006/0267296 A1* | 11/2006 | Dodd et al. | 280/5.512 |
| 2008/0036173 A1* | 2/2008 | Alguera | 280/407 |
| 2008/0036175 A1 | 2/2008 | Alguera | |
| 2008/0100032 A1* | 5/2008 | Alguera Gallego et al. | 280/420 |
| 2008/0129010 A1 | 6/2008 | Alguera | |

FOREIGN PATENT DOCUMENTS

| | | |
|---|---|---|
| DE | 41 42 317 A1 | 6/1993 |
| DE | 101 59 503 A1 | 6/2003 |
| DE | 10 2004 044 991 A1 | 4/2006 |
| EP | 0 853 033 A2 | 7/1998 |
| EP | 1 147 973 A1 | 10/2001 |
| WO | WO 2006/066819 A1 | 6/2006 |

* cited by examiner

*Primary Examiner* — Joanne Silbermann
*Assistant Examiner* — Wesley Potter
(74) *Attorney, Agent, or Firm* — Hudak, Shunk & Farine Co. LPA

(57) ABSTRACT

A coupling aid facilitates connecting at least one supply line between a first vehicle and a second vehicle which can be coupled to the first vehicle by means of a coupling. The coupling aid comprises a supply bracket mounted on the second vehicle and used to receive the at least one supply line. The supply bracket can be moved by means of a drive from a driving position (A) in the longitudinal centerline of the vehicle into an operating position (B) lateral to the driving position. The coupling is provided with at least a first sensor for detecting the locking state of the coupling and the movement of the supply bracket is triggered by a signal from the first sensor.

23 Claims, 2 Drawing Sheets

VEHICLE COUPLING AID WITH AUTOMATICALLY MOVING SUPPLY LINE CONNECTOR BRACKET

FIELD OF THE INVENTION

The invention concerns a coupling aid for the connection of at least one supply line between a first vehicle and a second vehicle which can be coupled to the first vehicle via a coupling, comprising a supply bracket arranged on the second vehicle for hooking up the at least one supply line, which can be moved by means of a drive from a driving position located in the longitudinal centerline of the vehicle into an operating position located sideways thereto.

DESCRIPTION OF THE RELATED ART

In practice, a first vehicle is usually driven up to a second vehicle and a coupling means of the second vehicle is brought into active engagement with a coupling arranged on the first vehicle and locked therein. The first and second vehicles can be, for example, a tractor and a semitrailer or a trailer. After the mechanical connection of the first and second vehicle, the supply lines of the first vehicle are usually hooked up to corresponding connections of the second vehicle, which are accommodated in a supply bracket. The supply lines can be both cables for an electrical connection and pressurized air hoses for a pneumatic connection of the first and second vehicle. In special instances, the term supply line can also mean a hydraulic hose connection.

On the first vehicle there is a stowage bracket, where the connector(s) can be hooked up when driving with no payload. The supply lines are connected to the tractor in physical proximity to the stowage bracket or by the stowage bracket itself. In order to make sure that approximately the same amount of storage lines is held in reserve when taking curves in either direction, when the front end of the second vehicle will swing outward, the supply lines are usually fabricated as spiral cables, and the stowage bracket is most often located in the longitudinal centerline of the vehicle.

Hooking up of the supply line(s) to the supply bracket of the second vehicle is done manually by the driver. For this, especially in the case of articulated trains, the driver needs to climb onto the tractor in the free space between trailer and driver's cabin, remove the connector from the stowage bracket and connect it to the supply bracket. The same procedure is done in reverse sequence before uncoupling the trailer from the tractor.

The main drawback is the high risk of injury during climbing onto the tractor. In order to create an incentive for the forwarding firms to reduce this risk of injury, occupational insurance agencies such as the French CRAM offer reduced premiums for vehicles on which the driver's movements on the vehicle are reduced. Furthermore, however, the space between the first and second vehicle is often wet and grimy, so that the driver often needs to change his damp and soiled clothing after the coupling procedures.

For this reason, coupling systems are already known, such as DE 10 2004 044 991 A1 or EP 0 853 033 B1, wherein the supply brackets can move from a driving position lying in the region of the longitudinal centerline of the vehicle into an operating position lying at the side of the vehicle. The driver is then able to hook up the supply lines manually, standing in the operating position alongside the vehicles, and then retract the supply bracket into the central position before beginning his trip.

BRIEF SUMMARY OF THE INVENTION

Now, the basic problem of the invention is to modify this known coupling system for supply lines so that an even quicker and more comfortable hooking up of the supply lines is possible.

The problem is solved according to the invention in that at least a first sensor is arranged on the coupling for detection of the locking state and the movement of the supply bracket is triggered by a signal of the first sensor. For the coupling of the second vehicle, the first vehicle moves backwards up to the parked second vehicle. The coupling is usually in an open, ready to insert condition. For an articulated train, the condition of the coupling changes from an open state to a locked state with the insertion of the coupling means, here, a kingpin, into the coupling. This change is detected by the first sensor and an automatic movement of the supply bracket is triggered. In order for the supply bracket to move, it is provided with its own drive unit, which can also be a spring element, which is released by the signal of the first sensor and thereby moves into the operating position. The signal transmission between the sensor and the drive unit of the supply bracket when the vehicles are not yet coupled together occurs in a noncontact manner, e.g., by radio, Blue Tooth, infrared, ultrasound, or another method known to the practitioner. After making the mechanical connection between the first and second vehicle, the driver can immediately begin to hook up the supply lines to the supply bracket, which has already moved into the operating position. The locking state is advantageous because the supply bracket should only move into the operating position after achieving a successful coupling of the second vehicle.

In a preferred embodiment, the first sensor is arranged in or in physical proximity to a fifth wheel of the first vehicle. The first sensor can detect the approaching and/or the contact of a kingpin of the second vehicle with the fifth wheel. The movement of the supply bracket in this embodiment is dependent on the presence of the kingpin in the active region of the first sensor located on the fifth wheel.

Alternatively or in addition to this, the first sensor can also detect the position of a locking mechanism of the fifth wheel, that is, not the kingpin directly, but rather the change in position of individual components of the locking mechanism after the insertion and automatic locking of the kingpin. This embodiment has the advantage that, in order to uncouple the second vehicle, the driver moves the locking mechanism from the locked position to an open position and this change is likewise detected by the first sensor in detecting the locking mechanism. In this way, there can also be an automatic movement of the supply bracket into the operating position during the uncoupling.

Advantageously, the driving position and/or the operating position of the supply bracket is detected via at least one position sensor. With the help of the additional sensor it is possible to indicate to the driver the position of the supply bracket after the coupling of the second vehicle to the first vehicle, for example, in the driver's cabin, and also to prevent driving away when the supply bracket is unintentionally left in the operating position thanks to a connection to the vehicle's electronics.

According to one favorable embodiment, a second sensor is arranged on the first vehicle, which detects the approach and/or the contact of the fifth wheel with a trailer's support plate. In this way, one can infer the presence of a second vehicle, so that one can carry out a plausibility check with regard to the signal of the first sensor, for example, if the kingpin is driven in too high. When the kingpin is properly inserted, the load of the support plate on the fifth wheel brings about a signal from the second sensor.

Preferably, the connection state of the at least one supply line is detected by a third sensor. In this way, one can check whether the driver has also hooked up all supply lines in the extended position of the supply bracket. If not, this can be indicated in the driver's cabin and will prevent the first vehicle from driving away by influencing the vehicle's electronics.

In the event that the first vehicle has a motor-operated wind deflector, its position can be detected with a fourth sensor. Such wind deflectors are often found on the roof, as well as at the side next to the first vehicle. During the coupling of a trailer, the position of the wind deflector should be detected and if a signal is present from the first sensor then the motor should be placed in operation to bring the wind deflector out of the range of the supply bracket extending into the operating position, so as not to damage the wind deflector and/or the supply bracket.

It has proven to be advantageous for the first vehicle to have a stowage bracket for hooking up the at least one supply line and for this stowage bracket to be detected by a fifth sensor. In this way, one recognizes whether the supply lines have been hung up in the stowage bracket as intended after the uncoupling. Otherwise, there is a danger that the first vehicle after the mechanical separation will drive away from the second vehicle with a connection line plugged into the supply bracket and the supply line will be torn off. It is also possible to sense whether the at least one supply line is hooked up to the stowage bracket or hanging down haphazardly from the first vehicle so that it might get damaged.

In particular, trailers of an articulated train usually have support jacks, whose extended state can be detected by a sixth sensor.

A fifth wheel arranged on a first vehicle can furthermore be arranged on a shift mechanism. In this case, the position of the fifth wheel on the shift mechanism should be detected with a seventh sensor.

According to one advantageous embodiment, at least one of the above described sensors is connected to a display device, which is preferably arranged in the driver's cabin of the first vehicle. In this simple embodiment, a possibly wrong position of the particular component is indicated to the driver in the driver's cabin.

The sensors can work with an induction, magnetic, or ultrasound principle. It is also possible to employ optical sensors.

Advantageously it is also provided to arrange a controller on the first vehicle, which is connected to at least one of the sensors and processes its signals. For example, the controller can be arranged on a fifth wheel or its understructure. This yields the benefit that the controller can also carry out a plausibility check and operator error can be for the most part ruled out.

It is especially advantageous when the controller controls the position of the at least one wind deflector. The moving of the motor-operated wind deflector is done by the controller as soon as it receives a signal from the first sensor and before a moving of the connection bracket into the operating position is triggered. This yields the benefit that damage to the wind deflector or the supply bracket can no longer occur.

In addition, the controller can control the extended state of motor-operated support jacks. These have to be brought into a retracted position after the second vehicle has been coupled to the first vehicle and before driving away. If one forgets to retract the support jacks, the controller can prevent the first vehicle from driving away by acting on the vehicle's electronics. Likewise, the controller can prevent the situation where one has forgotten to connect the at least one supply line to the supply bracket, despite the supply bracket being moved to the operating position, and instead the support jacks are retracted. If one has forgotten to apply the parking brakes, one or both vehicles may roll away.

Preferably, the controller controls the position of the fifth wheel on the shift mechanism.

Favorably, the controller also controls the drive of the supply bracket. In this way, it is possible, by involving the other sensor signals, to not only automatically extend the supply bracket into the operating position prior to the coupling, but also to retract it into the driving position after plugging in the supply lines. Prior to uncoupling, the controller could for example trigger an automatic movement of the supply bracket into the operating position after the extending of the support jacks.

Furthermore, it is possible for the controller to control the opening of the coupling. This is particularly advisable when the controller already detects an extending of the supply bracket and has also received a signal from the vehicle's electronics as to the condition of the brakes.

Another function of the controller can be to process a velocity signal of the first vehicle, that is, in particular, to prevent the vehicle from driving off with supply bracket in the extended position or, alternatively, to trigger an automatic movement of the supply bracket from the operating position to the driving position as soon as the controller receives a signal that the first vehicle is already in motion. One should avoid driving with the supply bracket in the operating position so as not to strike persons standing in physical proximity to the vehicle or rip off the supply bracket projecting beyond the contour of the vehicle during its travel.

Advantageously, the controller processes a signal from the brakes of the first vehicle and/or second vehicle. Likewise, the controller can put out a signal to the brakes of the first vehicle and/or second vehicle. This holds especially for the situation of rolling away of the second vehicle after being uncoupled when not secured by the parking brakes. In these cases, the controller even without applying the parking brakes would prevent the supply bracket from extending, which would call the driver's attention to the malfunctioning.

In an especially favorable embodiment, the controller processes a signal from the pneumatic shock absorption and/or controls the height of the pneumatic shock absorption.

BRIEF DESCRIPTION OF THE DRAWINGS

For better comprehension, the invention shall now be explained more closely by means of four figures. These show.

DETAILED DESCRIPTION OF THE INVENTION

Figure 1:
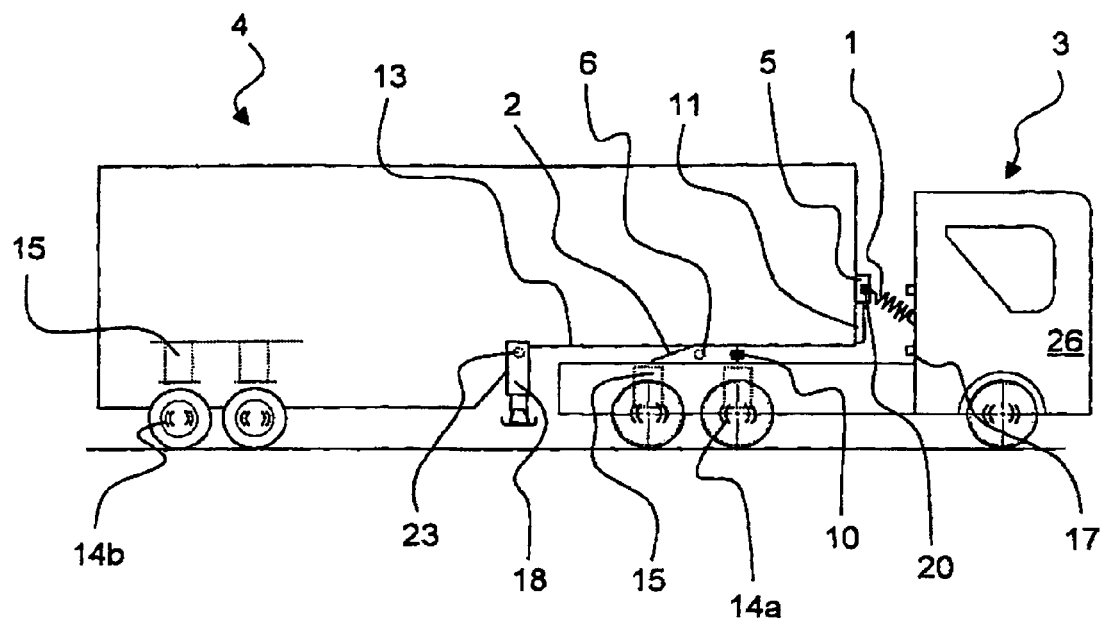
FIG. 1: a schematic side view of a first and second vehicle with a coupling aid according to the invention.

FIG. 1 shows as the first vehicle 3 a tractor with a trailer as the second vehicle 4, temporarily coupled to the former via a coupling 2. The first vehicle 3 has a driver's cabin 26, at the back side of which several stationary supply lines 1 emerge. In the depicted coupled condition of the two vehicles 3, 4, the supply lines 1 are plugged into a supply bracket 5 arranged at the front end of the trailer 4, so that the trailer 4 is supplied with compressed air and electricity. In addition, supply lines 1 can also be provided for the transmission of control signals.

Figure 4:
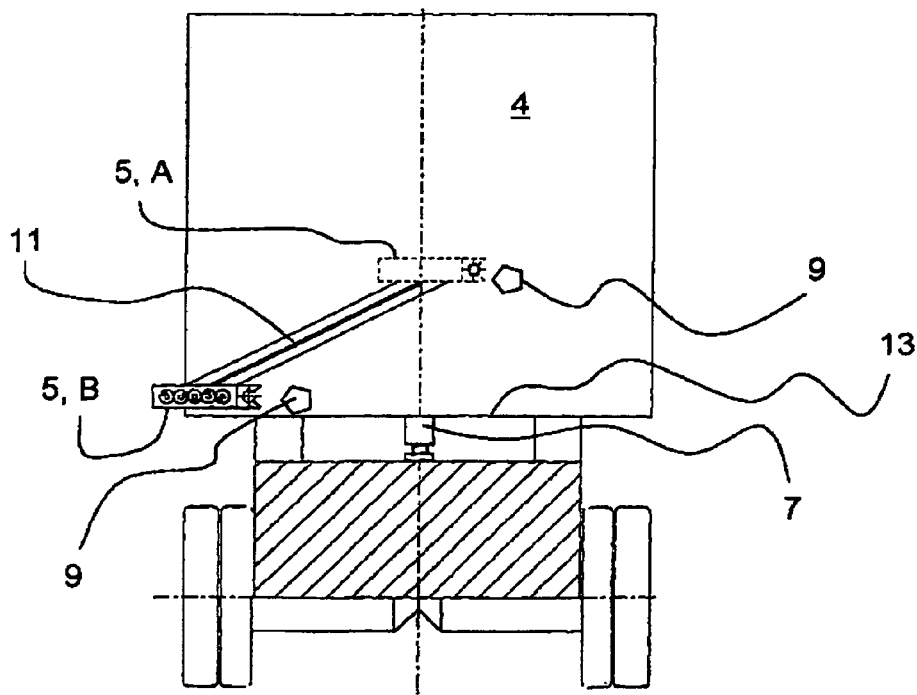
FIG. 4: a front view of a second vehicle with movable supply bracket.

The supply bracket 5 can be swiveled from a middle driving position A into a sideways operating position B for the attaching and detaching of the supply lines 1, as is especially well seen in FIG. 4.

Figure 2:
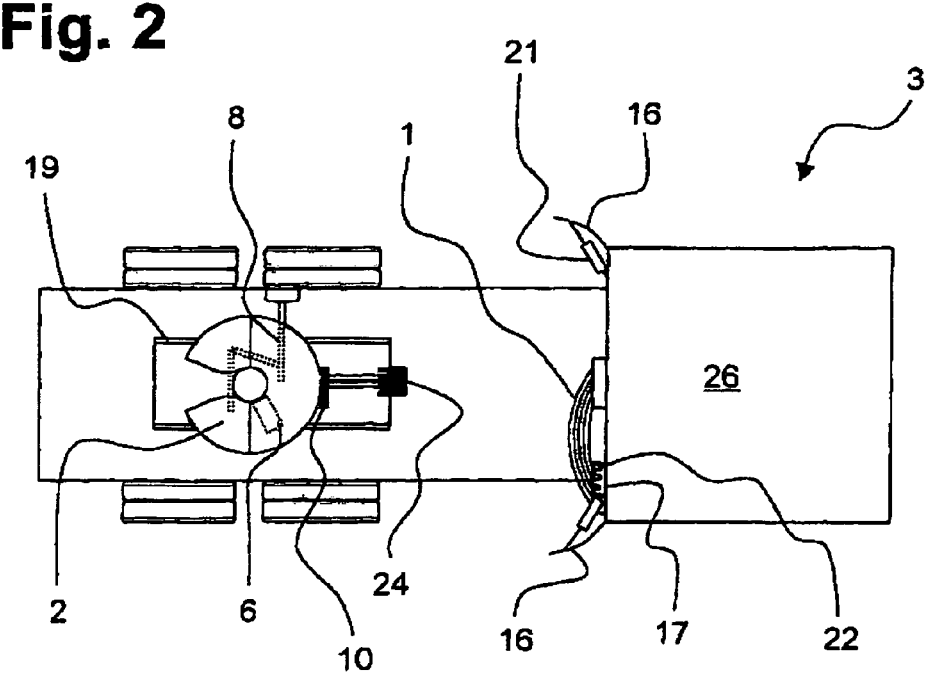
FIG. 2: a top view of a first vehicle with components of the coupling aid.

According to the invention, a first sensor 6 is located on the coupling 2, which monitors the locked status of the locking mechanism 8 (see FIG. 2). After the mechanical coupling of the trailer 4 to the tractor 3, the first sensor 6 ascertains a change in state of the locking mechanism 8 and causes the supply bracket 5 to move out into the operating position B. Instead of the locking mechanism 8, one can also have the first sensor 6 detect when a kingpin 7 (see FIG. 4), arranged on the underside of a bearing plate 13, is inserted into the fifth wheel 2. Since the vehicles 3, 4 are not yet mechanically coupled together, the transmission of the signal of the first sensor 6 to move the supply bracket 5 should be wireless, for example, via radio.

The vehicles 3, 4 depicted in FIG. 1 have several additionally monitored vehicle components, whose signals are processed together with the signal of the first sensor 6 in a controller 10 mounted on the fifth wheel 2. In these cases, a wireless link can be provided between the controller 10 and the supply bracket 5.

One of the monitored vehicle components are the connection of the supply bracket 5 (not otherwise depicted) via a third sensor 20. If the supply lines 1 have been plugged in by the driver in the swiveled-out operating position B, the controller 10 enables an automatic retraction of the supply bracket 5 to the driving position A. For this, the controller 10 releases a control signal which goes to a drive 11 of the supply bracket 5.

There are two support jacks 18 mounted on the trailer 4, only the front support jack being recognizable in the side view depicted. Prior to the mechanical separation of the tractor 3 from the trailer 4, the support jacks 18 are extended until they make contact with the ground and the trailer 4 is standing with its front region on the support jacks 18. After again coupling the trailer 4 to a tractor 3, the support jacks 18 have to be retracted before driving away. The travel status of the support jacks 18 is detected by a sixth sensor 23, which is likewise connected to the controller 10. In this way, an automated retraction of the support jacks 18 can occur by means of a support jack motor (not shown), for example, after detecting a secure locking of the locking mechanism 8 and possibly a plugging of the supply lines 1 into the connection bracket 5.

A further enhancement of operating safety is achieved when signals from the brakes 14a, 14b of at least one of the vehicles 3, 4 are additionally detected and furnished to the controller 10 as an input signal. The incorporation of the brake signal into the evaluation of the input data of the controller 10 can prevent, for example, an opening of the fifth wheel 2 before the parking brake 14b of the trailer 4 has been engaged, as it might otherwise roll away uncontrolled after the coupling 2 is opened on sloping ground.

An especially comfortable coupling of the trailer 4 to the tractor 3 is achieved when both vehicles 3, 4 after detecting a proper locking of the locking mechanism 8 (see FIG. 2) with the kingpin 7 of the trailer 4 are lifted by the pneumatic shock absorption 15 to a drive-ready position without the intervention of the driver. This control signal to the pneumatic shock absorption 15 can also come from the controller 10.

FIG. 2 shows a top view of the first vehicle 3. One notices that wind deflectors 16 stick out from both sides of the driver's cabin 26. These wind deflectors 16 have to be swiveled out in order to connect the supply lines 1, so that sufficient space is available for the moving of the supply bracket 5 into the operating position B. This swinging out of the side wind deflectors 16 can be done by motor. If the respective position of the wind deflector 16 is being monitored by a fourth sensor 21, this signal can likewise be made available by the controller 10 as an input signal. In this way, a swinging out of the wind deflectors 16 can first be triggered effectively and after a time lapse the supply bracket 5 is moved into the operating position B, so that no collision is possible between wind deflectors 16 and supply bracket 5.

FIG. 2 furthermore shows a stowage bracket 17 located at the rear wall of the driver's cabin 26. The stowage bracket 17 serves to take up the supply lines 1 or their connector mounted at one end when the first vehicle 3 is running without a payload, so that they do not swing haphazardly around. The plugging of the supply lines 1 into the stowage bracket 17 is monitored by a fifth sensor 22 arranged on the stowage bracket 17. This fifth sensor 22 can likewise interact with the controller 10, which in turn acts on the vehicle electronics if the supply lines 1 are not plugged in and prevents a releasing of the brakes 14a, 14b, for example (see FIG. 1).

The first vehicle 3 depicted in FIG. 2 has a shift mechanism 19, which enables a shifting of the fifth wheel 2. The position of the fifth wheel 2 can be sensed by means of a seventh sensor 24, whose output signal is taken into consideration in the controller 10. The controller 10 can then cause an opening out of the wind deflectors 3 if they lie in the swivel range of the front end of the trailer 3 when the fifth wheel 2 is far advanced in the direction of the driver's cabin.

Figure 3:
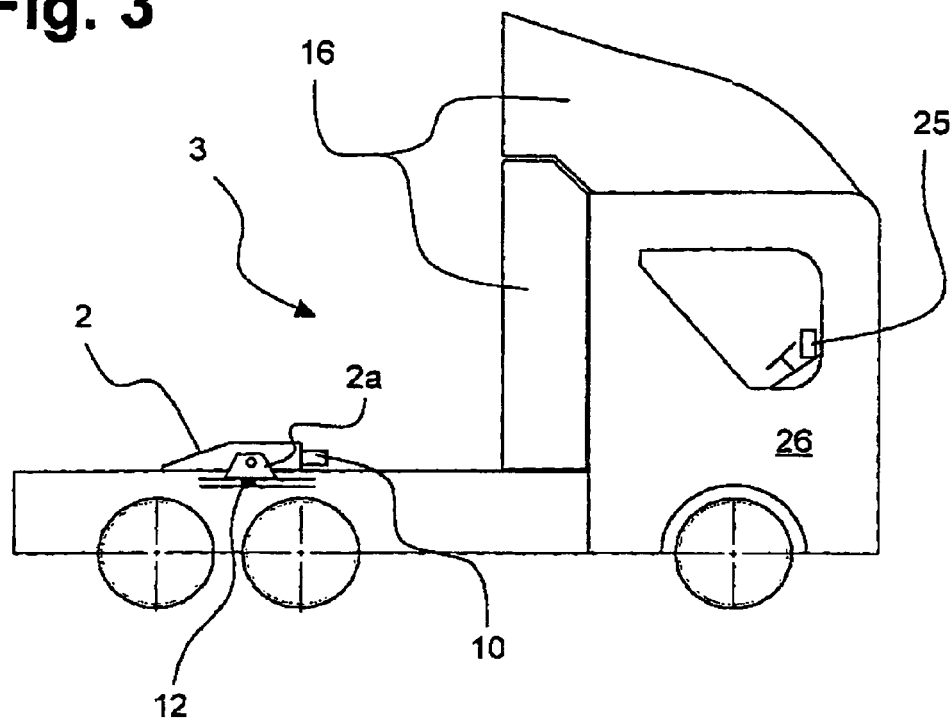
FIG. 3: a side view of the first vehicle per FIG. 2.

FIG. 3 shows a side view of the tractor 3. The fifth wheel 2 is mounted on an understructure 2a. By placing a second sensor 12 on the fifth wheel 2 or its understructure 2a, a load lying on the fifth wheel 2 can be detected and likewise be evaluated in the controller 10.

At the front end of the trailer 4 is found the supply bracket 5, which can move between two positions A and B. The two positions A, B are each detected by a position sensor 9 and routed to the controller 10 (see FIGS. 1 to 3). With the help of this information, in particular, it is possible to automatically bring the supply bracket 5 back to the driving position A after a plugging in of the supply lines 1 by the drive 11 configured as a linear drive in FIG. 4 and thereby prevent a driving away with supply bracket 5 unintentionally left in the operating position B. The logical evaluation of the signal of the position sensor 9 is done via the controller 10.

The measurement values respectively detected by the sensors 6, 9, 12, 20, 21, 22, 23, 24 are indicated to the driver via a display device 25 arranged in the driver's cabin 26.

FIG. 4 shows a trailer 4 in a front view without a tractor 3, and for reasons of clarity the support jacks 18 have been left out of the drawing. On the underside of the bearing plate 13, the kingpin 7 protrudes in the center axis of the vehicle, being guided into a fifth wheel 2 and locked therein for the coupling process.

LIST OF REFERENCE NUMBERS 1 supply line
2 coupling, fifth wheel
2a fifth wheel understructure
3 first vehicle, tractor
4 second vehicle, trailer
5 supply bracket
6 first sensor
7 kingpin
8 locking mechanism of fifth wheel
9 position sensor 10 controller
11 drive for supply bracket
12 second sensor
13 bearing plate
14a brakes of first vehicle
14b brakes of second vehicle
15 pneumatic shock absorption
16 wind deflector
17 stowage bracket
18 support jacks
19 shift mechanism
20 third sensor (supply line connection status)
21 fourth sensor (wind deflector position)
22 fifth sensor (stowage bracket)
23 sixth sensor (support jack extension status)
24 seventh sensor (shift mechanism position)
25 display device
26 driver's cabin
A driving position
B operating position

What is claimed is:

1. A coupling aid for the connection of at least one supply line between a first vehicle and a second vehicle which can be coupled to the first vehicle via a coupling, comprising a supply bracket arranged on the second vehicle for hooking up the at least one supply line, wherein the supply bracket can be moved by means of a drive from a driving position (A) located in the longitudinal centerline of the second vehicle into an operating position (B) located toward one side of the second vehicle relative to the longitudinal centerline of the second vehicle, wherein a first sensor is arranged on the coupling for detection of a locking state of the coupling and the movement of the supply bracket is triggered by a signal from the first sensor.

2. The coupling aid according to claim 1, wherein the coupling comprises a fifth wheel, and wherein the first sensor is arranged in or in physical proximity to the fifth wheel of the first vehicle.

3. The coupling aid according to claim 2, wherein the first sensor detects at least one of approach by a kingpin of the second vehicle toward the fifth wheel and contact by the kingpin with the fifth wheel.

4. The coupling aid according to claim 2, wherein the first sensor detects a position of a locking mechanism of the fifth wheel.

5. The coupling aid according to claim 2, wherein the second vehicle is a trailer and wherein a second sensor is arranged on the first vehicle, wherein said second sensor detects at least one of approach of a support plate of the trailer toward the fifth wheel and contact of the support plate with the fifth wheel.

6. The coupling aid according to claim 1, wherein at least one of the driving position (A) of the supply bracket and the operating position (B) of the supply bracket is detected via at least one position sensor.

7. The coupling aid according to claim 1, wherein the connection state of the at least one supply line is detected by a third sensor.

8. The coupling aid according to claim 1, wherein the first vehicle has at least one motor-operated wind deflector, wherein the position of said wind deflector is detected with a fourth sensor.

9. The coupling aid according to claim 1, wherein the first vehicle has a stowage bracket for hooking up the at least one supply line, wherein the hookup of the at least one supply line to the stowage bracket is detected by a fifth sensor.

10. The coupling aid according to claim 1, wherein the second vehicle has support jacks, and wherein the extended state of said support jacks is detected by a sixth sensor.

11. The coupling aid according to claim 1, wherein the coupling comprises a fifth wheel and wherein the fifth wheel is arranged on a shift mechanism on the first vehicle and a position of the fifth wheel on the shift mechanism is detected with a seventh sensor.

12. The coupling aid according to claim 1, wherein the vehicle comprises a plurality of sensors, wherein said plurality of sensors includes the first sensor, and wherein at least one of the plurality of sensors is connected to a display device, which is preferably arranged in a driver's cabin of the first vehicle.

13. The coupling aid according to claim 1, wherein the vehicle comprises a plurality of sensors, wherein said plurality of sensors includes the first sensor, and wherein a controller is arranged on the first vehicle, which is connected to at least one of the plurality of sensors and processes its signals.

14. The coupling aid according to claim 13, wherein the coupling comprises a fifth wheel, and wherein the controller is arranged on the fifth wheel or an understructure of the fifth wheel.

15. The coupling aid according to claim 13, wherein the controller controls the position of at least one wind deflector.

16. The coupling aid according to claim 13, wherein the controller controls an extended state of support jacks.

17. The coupling aid according to claim 13, wherein the coupling comprises a fifth wheel, and wherein the controller controls the position of the fifth wheel on a shift mechanism.

18. The coupling aid according to claim 13, wherein the controller controls the drive of the supply bracket.

19. The coupling aid according to claim 13, wherein the controller controls the locking state of the coupling between an open state and a locked state.

20. The coupling aid according to claim 13, wherein the controller processes a velocity signal of the first vehicle.

21. The coupling aid according to claim 13, wherein the controller processes a signal from brakes of at least one of the first vehicle and the second vehicle.

22. The coupling aid according to claim 21, wherein the controller puts out a signal to the brakes of at least one of the first vehicle and the second vehicle.

23. The coupling aid according to claim 13, wherein the controller performs at least one function selected from the group of processing a signal from a pneumatic shock absorber and controlling a height of the pneumatic shock absorber.

* * * * *